Dec. 30, 1958    M. L. SMALLEGAN    2,866,536
FEED RETURN GATES
Filed March 10, 1955
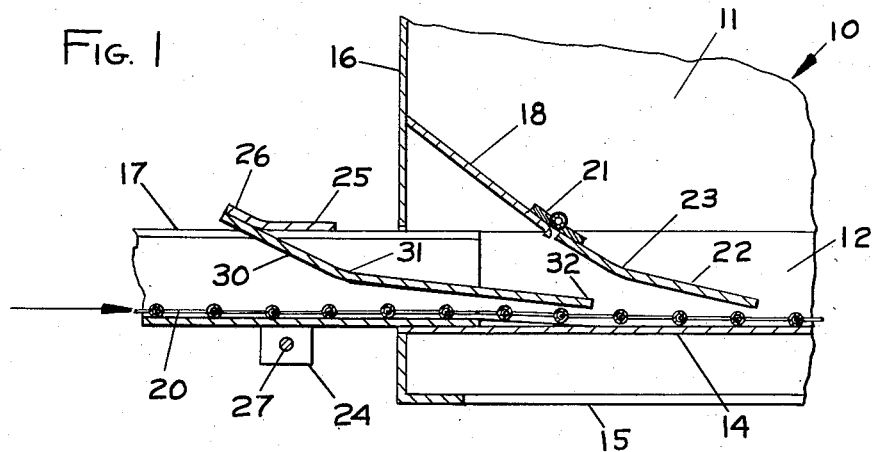
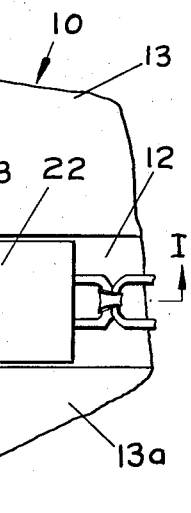
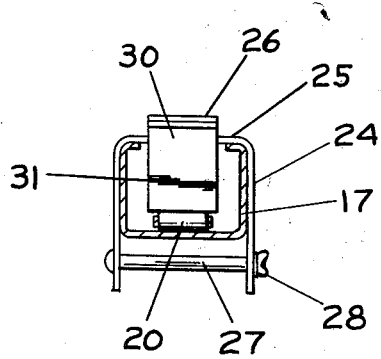
INVENTOR.
MARVIN L. SMALLEGAN
BY
ATTORNEY

United States Patent Office 2,866,536
Patented Dec. 30, 1958

2,866,536

FEED RETURN GATES

Marvin L. Smallegan, Zeeland, Mich., assignor to Automatic Poultry Feeder Company, Zeeland, Mich., a corporation of Michigan Application March 10, 1955, Serial No. 493,334

5 Claims. (Cl. 198—57)

This invention relates to mechanical, automatically operated, poultry feeding equipment and more particularly to a gate means by which excess feed returned by the conveyor system may be reintroduced into the bottom of the hopper.

The problem of reintroducing to the hopper excess feed returned by the conveyor lines has always been a serious problem in the automatic poultry feeding equipment field. Where the conveying equipmemnt such as the chain or belt passes through the bottom of the hopper, the mass of bulk feed present in the hopper prevents the feed from being reintroduced into the bottom of the hopper. As a result, the feed piles up at the point of entry of the chain into the hopper. If this continues for any length of time, the pile of feed becomes so great it spills over the sides of the trough and is wasted. This represents an appreciable loss to the operator.

To overcome this, it has been conventional practice to remove the feed entirely from the conveyor trough just before the conveyor itself enters the bottom of the hopper and by separate means to elevate it and discharge it into the top of the hopper. While this system works quite satisfactorily, it involves considerable additional equipment and materially increases the initial cost of the installation.

This invention overcomes these difficulties by providing a simple, inexpensive dual gate mechanism which positively permits the feed to be reintroduced into the bottom of the hopper by the conveyor. It prevents piling up of the feed in the conveyor trough. The dual gate system has two pivoted members but otherwise no moving parts. It is, therefore, durable and mechanically dependable. Its design permits it to be incorporated on existing equipment, thus making it possible to improve prior equipment by incorporating this feature.

These and other objects and purposes of this invention will be immediately seen by those acquainted with the design and use of automatic poultry feeding equipment upon reading the following specification and the accompanying drawings.

In the drawings:

Fig. 1 is a fragmentary, sectional, elevation view taken along the plane I—I of Fig. 2.

Fig. 2 is a fragmentary, sectional, plan view of my invention.

Fig. 3 is a sectional, elevation view taken along the plane III—III of Fig. 2.

In executing the objects and purposes of this invention, I have provided a hopper having a trough at the bottom along which passes one or more conveyor chains designed to transport bulk feed from the hopper in measured quantities and carry it along a closed trough system. Any feed not utilized as it traverses the closed trough system is returned to the bottom of the hopper at the point of entry of the conveyor chain. This invention is applied at this point.

This invention provides a first gate consisting of a strip designed to resiliently press down upon the feed as it is moved under it by the conveyor. The pressure exerted by this first gate compresses the feed to sufficient firmness that as the feed passes under the second gate it will lift the second gate and thus pass into the feed hopper. The second gate is the same as the first gate and like it resiliently presses down upon the feed. The weight of that portion of the bulk feed present in the hopper immediately above the second gate presses down on the second gate. However, due to the compactness of the feed as the result of the pressure applied by the first gate, the feed, instead of piling up because of its inability to lift the second gate, will raise the second gate permitting the movement of the conveyor chain to carry the feed into the hopper and incorporate it into the mass of bulk feed present therein.

Referring specifically to the drawings, the numeral 10 indicates a hopper having a bulk feed compartment 11 and a channel 12 at the bottom in open communication with the bulk feed bin 11. Preferably, the side walls 13 and 13a of the hopper converge toward the channel 12 to urge the feed into the channel. The bottom of the channel 12 is formed by a floor 14. The whole hopper unit is supported by a leg structure 15. The end of the hopper is closed by an end wall 16.

The size of the channel 12 is such that it will telescopically receive into it the open end of a trough 17. The trough consists of a plurality of sections normally so arranged that they form a closed loop with the channel 12 forming one portion of the loop. A suitable opening is provided in the end wall 16 to permit the passage therethrough of the trough 17 into the channel 12.

Immediately within the hopper 10 and overlying the channel 12 is a stationary, sloping baffle 18. The baffle 18 prevents the bulk feed in the bin 11 from reaching the area of the channel immediately adjacent the point where the trough enters the channel.

Seated in the bottom of the trough 17 and the bottom of the channel 12 is an endless chain 20. The endless chain 20 traverses the entire loop formed by the trough and channel and serves as the conveyor means by which feed is removed from the hopper transported around the loop of trough and returned to the hopper. When the equipment is in operation, this chain is in constant, slow movement in the direction indicated by the arrow in Fig. 1. The particular type and design of the chain is immaterial to this invention. Likewise, whether a chain, belt or tape is used is also immaterial since the invention will operate with any of these types of conveying equipment.

Rigidly secured to the lower end of the baffle 18 is a spring loaded hinge 21. The hinge 21 provides a resilient, pivotal mounting for the upper end of the inner gate 22. The inner gate 22 consists of an elongated, strip or finger. In a downwardly and inwardly direction, it converges at a small angle with the chain with its inner end designed to rest upon the chain 20. At a point intermediate the hinge 21 and its lower end, the inner gate is slightly bent at 23 to permit the convergence of its lower end with the chain to occur at a small angle. The importance of this will appear more fully under "Operation."

The hinge 21 may be of any suitable, spring loaded type. It will be recognized that the hinge 21 may be eliminated and any suitable resilient joint substituted which will permit the inner gate to rise and fall in response to material moving under the gate. The downward force generated by the hinge 21 is only sufficient to assure the inner gate's closing when no material is passing under it and there is insufficient weight of feed in the bulk bin 11 to force its closing action.

Mounted on the trough 17 exteriorly of the hopper 10 is a U-shaped bracket 24. The U-shaped bracket 24 has a web portion 25 designed to extend over the top of the trough. The web portion has an upwardly and rearwardly inclined arm 26. The lower ends of the sides of the bracket 24 extend below the trough and are joined by a bolt 27 equipped with a wing nut 28 on one end. By tightening the wing nut, the bracket is clamped about the trough in the particular position lengthwise of the trough that will produce the most efficient operation of the outer gate.

The arm 26 mounts the upper end of the outer gate 30. The outer gate 30 consists of an elongated, resilient finger which, like the inner gate, has intermediate its ends a bend 31. The inner end of the finger 31 is of substantial length and in an inwardly and downwardly direction converges at a small angle with the chain 20. When the chain 20 is carrying no material, the lower end of the outer gate 30 either rests upon the chain or just clears its top surface.

The bracket 24 is so positioned longitudinally of the trough and the length of the outer gate 30 is such that the inner end 32 of the outer gate projects a substantial distance under the inner gate 22. Preferably, the outer gate is fabricated from a thin gauge, spring steel. No other springs or weights are utilized to cause downward movement of the outer gate 30.

Operation

While automatic feeding equipment of this type is normally set to dispense only that amount of feed which will be utilized by the poultry by the time the chain has completed its travel of the trough, this demand fluctuates. Thus, while the chain will return little or no feed during one period, there will be other periods when substantially all of the feed initially removed from the hopper must be returned to the hopper. Unless this feed is returned to the hopper rather than spilled, the value of this type of automatic feeding equipment will be nullified because of its high cost of operation. The object of this invention is to return this excess feed continuously and efficiently to the hopper, despite wide fluctuation of the quantity of the feed being returned.

While the equipment is operating, the chain 20 is in continuous motion. Normally, its linear velocity is small, thus, anything that is being carried by the chain is gradually passed under any object bearing down on the chain. With the chain moving in the direction indicated by the arrow in Fig. 1, the feed carried by the chain is pulled under the outer gate 30. The mass of the feed carried by the chain raises the inner end 32 of the gate 30.

Because of the slow movement of the chain and of the small angle at which the outer gate 30 and the chain converge, the downward pressure applied by the gate 30 is not applied to the feed suddenly but rather gradually increases as the feed passes further and further under the gate. Thus, the outer gate does not tend to act as a scraper or baffle in the path of the feed but instead it compresses the feed compactly into the chain as a firm mass. This gradual application of pressure eliminates the possibility of the feed piling up behind the outer gate.

When the feed has passed beyond the inner end 32 of the outer gate, it is compressed tightly against the chain forming a compact mass having sufficient density to lift the inner gate 22. The ability of the compacted feed to lift the inner gate prevents this gate from acting as a scraper to pile it up against its upstream side. As the feed moves on, the compact mass gradually passes under the inner gate. Because of the small angle of convergence between the inner gate and the chain, the pressure of the inner gate is gradually applied to the feed. This gradual application of pressure is slow enough that the feed, rather than backing up against the inner gate, lifts the gate. This occurs despite the resistance of the spring loaded hinge 21 and the weight of the feed in the hopper bin 11 pressing down against the inner gate.

Once the inner gate has been lifted, the feed freely passes into the bottom of the hopper and there is incorporated into the mass of bulk feed already present in the hopper. Once the feed is within the hopper and beyond the end of the inner gate, it cannot work its way backwardly up the chain toward the outer gate because the nature and shape of the inner gate positively prevents this. Unless the feed is compacted firmly into and against the chain before it makes contact with the inner gate, it will be incapable of lifting the inner gate.

It will be seen that this invention provides an inexpensive, simple means by which the troublesome problem of reintroduction of feed into the bottom of a bulk hopper may be accomplished. Because of its simplicity it is not subject to operational failure. It will be readily seen that this invention may be applied to existing equipment without modification of the basic structure of the equipment. This is particularly true since many units of existing equipment of this type are already equipped with the inner gate, therefore making it necessary only to secure the outer gate on the trough.

While this invention has been described as applied to an automatic feeder having only a single trough line, it will be recognized that it may be applied with equal facility to feeding equipment having two or more troughs by simply providing an inner and an outer gate for each trough. It is necessary to provide independent gates for each trough because of the wide variations which normally occur in the amount of feed being returned by each trough.

While I have described a preferred embodiment of my invention, it will be recognized that various modifications of this invention may be made, each without departing from the principles thereof. Each of these modifications is to be considered as included in the hereinafter appended claims unless these claims by their language expressly state otherwise.

I claim:

1. A feed return gate adapted to be mounted in a trough having an endless conveyor means traveling therein, said trough and endless conveyor means passing through a hopper, said return gate comprising: an elongated resilient finger and means rigidly mounting one end of said finger adjacent the top of said trough; the other end of said finger being free, biased downwardly toward said conveyor, and extending down into said trough and converging in the direction of movement of said endless conveyor, with said trough at a small angle; a second finger downstream of said first finger and means mounting one end thereof above said trough within said hopper; the other end of said finger being free, downwardly inclined and resiliently biased against said endless conveyor; a major portion of said second finger overlying said first finger and normally vertically spaced therefrom.

2. A feed return gate adapted to be mounted in a trough having an endless conveyor means traveling therein; said trough and endless conveyor means passing through a hopper, said return gate comprising: an outer gate element adapted to compress material carried by said endless conveyor; an inner gate element mounted within said hopper and converging at a small angle with said endless conveyor in the direction of movement of said endless conveyor; an inner gate extending substantially downwardly to said conveyor and resiliently biased toward said conveyor; a major portion of said inner gate element overlying said outer gate element and normally vertically spaced therefrom.

3. In the method of introducing comminuted material carried by an endless conveyor into the bottom of a hopper partially filled with said material; the steps which include: compressing said material against said endless conveyor; moving said compressed material into progressively increasing engagement with the under surface of a material supporting gate located in said hopper and biased toward said conveyor thereby urging said gate upwardly by means of said compressed material, and moving said compressed material past said gate into said hopper.

4. In the method of introducing comminuted material carried by an endless conveyor into the bottom of a hopper partially filled with said material, said hopper having therein a pivoted gate urged downwardly against said endless conveyor by the weight of superimposed quantities of said material in said hopper, the steps of which include: compressing said material upstream of said gate against said endless conveyor; moving said compressed material beneath said gate thereby causing said gate to pivot upwardly under the urging of said compressed material.

5. A feed return gate adapted to be mounted in a trough having an endless conveyor means traveling therein; said endless conveyor means passing through a hopper, said return gate comprising: an outer gate element adapted to compress material carried by said endless conveyor; an inner gate element mounted within said hopper downstream of said outer gate element and converging at a small angle with said endless conveyor in the direction of movement of said endless conveyor; said inner gate element being biased downwardly and extending substantially downwardly to said conveyor whereby it is raised by said compressed material as said compressed material is moved thereunder by said endless conveyor.

References Cited in the file of this patent

UNITED STATES PATENTS

| | | |
|---|---|---|
| 1,022,325 | Moore | Apr. 2, 1912 |
| 1,627,925 | Payzant | May 10, 1927 |
| 2,589,690 | Graetz | Mar. 18, 1952 |